(12) United States Patent
Inoue

(10) Patent No.: US 9,834,201 B2
(45) Date of Patent: Dec. 5, 2017

(54) DEVICE FOR CONTROLLING HYBRID VEHICLE

(71) Applicant: Toshio Inoue, Gotenba (JP)

(72) Inventor: Toshio Inoue, Gotenba (JP)

(73) Assignee: Toyota Jidosha Kabushiki Kaisha, Toyota-shi, Aichi (JP)

(*) Notice: Subject to any disclaimer, the term of this patent is extended or adjusted under 35 U.S.C. 154(b) by 73 days.

(21) Appl. No.: 14/782,768

(22) PCT Filed: Apr. 10, 2013

(86) PCT No.: PCT/JP2013/060874
§ 371 (c)(1),
(2) Date: Oct. 6, 2015

(87) PCT Pub. No.: WO2014/167681
PCT Pub. Date: Oct. 16, 2014

(65) Prior Publication Data
US 2016/0046284 A1 Feb. 18, 2016

(51) Int. Cl.
*B60W 20/00* (2016.01)
*F02D 41/02* (2006.01)
(Continued)

(52) U.S. Cl.
CPC .............. *B60W 20/40* (2013.01); *B60K 6/48* (2013.01); *B60K 6/547* (2013.01); *B60W 10/02* (2013.01);
(Continued)

(58) Field of Classification Search
CPC .. B60W 20/40; B60W 50/0205; B60W 10/08; B60W 20/50; B60W 30/20;
(Continued)

(56) References Cited

U.S. PATENT DOCUMENTS 7,686,112 B2 * 3/2010 Shiiba .................. B60K 6/48
180/65.21
8,052,575 B2 * 11/2011 Albertson ............. F16H 61/143
477/98
(Continued)

FOREIGN PATENT DOCUMENTS

JP 2008-7094 1/2008
JP 2008-267239 11/2008
(Continued)

*Primary Examiner* — Frederick Brushaber
(74) *Attorney, Agent, or Firm* — Finnegan, Henderson, Farabow, Garrett & Dunner, LLP

(57) ABSTRACT

A control device of a hybrid vehicle including an engine, an electric motor coupled to a power transmission path between the engine and drive wheels, and a clutch connecting/disconnecting a power transmission path between the engine and both the electric motor and the drive wheels, the control device performing detection of air-fuel ratio variation between cylinders of the engine, the control device changing an operation state of the clutch based on a request drive force of the vehicle, and the control device performing the detection of air-fuel ratio variation when the clutch is in an open state or a slip amount of the clutch is equal to or larger than a preset value.

4 Claims, 3 Drawing Sheets

(51) Int. Cl.

| | | |
|---|---|---|
| *B60W 50/02* | (2012.01) | |
| *B60W 10/06* | (2006.01) | |
| *B60W 10/02* | (2006.01) | |
| *B60K 6/48* | (2007.10) | |
| *B60K 6/547* | (2007.10) | |
| *F02D 29/02* | (2006.01) | |
| *B60W 20/40* | (2016.01) | |
| *B60W 30/20* | (2006.01) | |
| *F16D 48/06* | (2006.01) | |
| *B60W 10/08* | (2006.01) | |
| *B60W 20/50* | (2016.01) | |

(52) U.S. Cl.
CPC ............ *B60W 10/06* (2013.01); *B60W 10/08* (2013.01); *B60W 20/00* (2013.01); *B60W 20/50* (2013.01); *B60W 30/20* (2013.01); *B60W 50/0205* (2013.01); *F02D 29/02* (2013.01); *F02D 41/022* (2013.01); *F16D 48/06* (2013.01); *B60W 2510/0619* (2013.01); *F16D 2500/1066* (2013.01); *F16D 2500/3061* (2013.01); *F16D 2500/3063* (2013.01); *F16D 2500/3067* (2013.01); *F16D 2500/30406* (2013.01); *F16D 2500/5102* (2013.01); *F16D 2500/5108* (2013.01); *F16D 2500/7041* (2013.01); *Y02T 10/6221* (2013.01); *Y10S 903/902* (2013.01)

(58) Field of Classification Search
CPC ...... B60W 10/02; B60W 10/06; B60W 20/00; F02D 41/022; F02D 29/02; F16D 48/06; F16D 2500/30406; F16D 2500/70; B60K 6/48; B60K 6/547
See application file for complete search history.

(56) References Cited

U.S. PATENT DOCUMENTS

| | | | | |
|---|---|---|---|---|
| 8,066,619 | B2* | 11/2011 | Herchick | F16D 48/06 477/175 |
| 8,308,595 | B2* | 11/2012 | Noda | B60L 3/0023 475/116 |
| 8,308,605 | B2* | 11/2012 | Kaltenbach | B60W 10/08 477/5 |
| 8,498,765 | B2* | 7/2013 | Tajima | B60K 6/48 180/65.1 |
| 8,512,201 | B2* | 8/2013 | Shimanaka | B60K 6/48 477/5 |
| 2002/0006848 | A1* | 1/2002 | Tabata | F02D 23/00 477/32 |
| 2004/0209734 | A1* | 10/2004 | Mitsutani | F02D 41/0295 477/111 |
| 2007/0272456 | A1 | 11/2007 | Shiiba | |
| 2009/0227407 | A1* | 9/2009 | Kamada | B60K 6/445 475/5 |
| 2012/0271530 | A1* | 10/2012 | Wada | F02D 41/2451 701/104 |
| 2013/0296121 | A1* | 11/2013 | Gibson | F02D 41/022 477/5 |
| 2013/0297191 | A1* | 11/2013 | Gibson | F02N 11/0855 701/112 |
| 2014/0309080 | A1* | 10/2014 | Gibson | B60W 10/06 477/181 |
| 2015/0307076 | A1* | 10/2015 | Leone | F02D 19/024 701/54 |

FOREIGN PATENT DOCUMENTS

| | | |
|---|---|---|
| JP | 2012-6416 | 1/2012 |
| JP | 2012-47089 | 3/2012 |
| JP | 2012/144219 | 8/2012 |

* cited by examiner

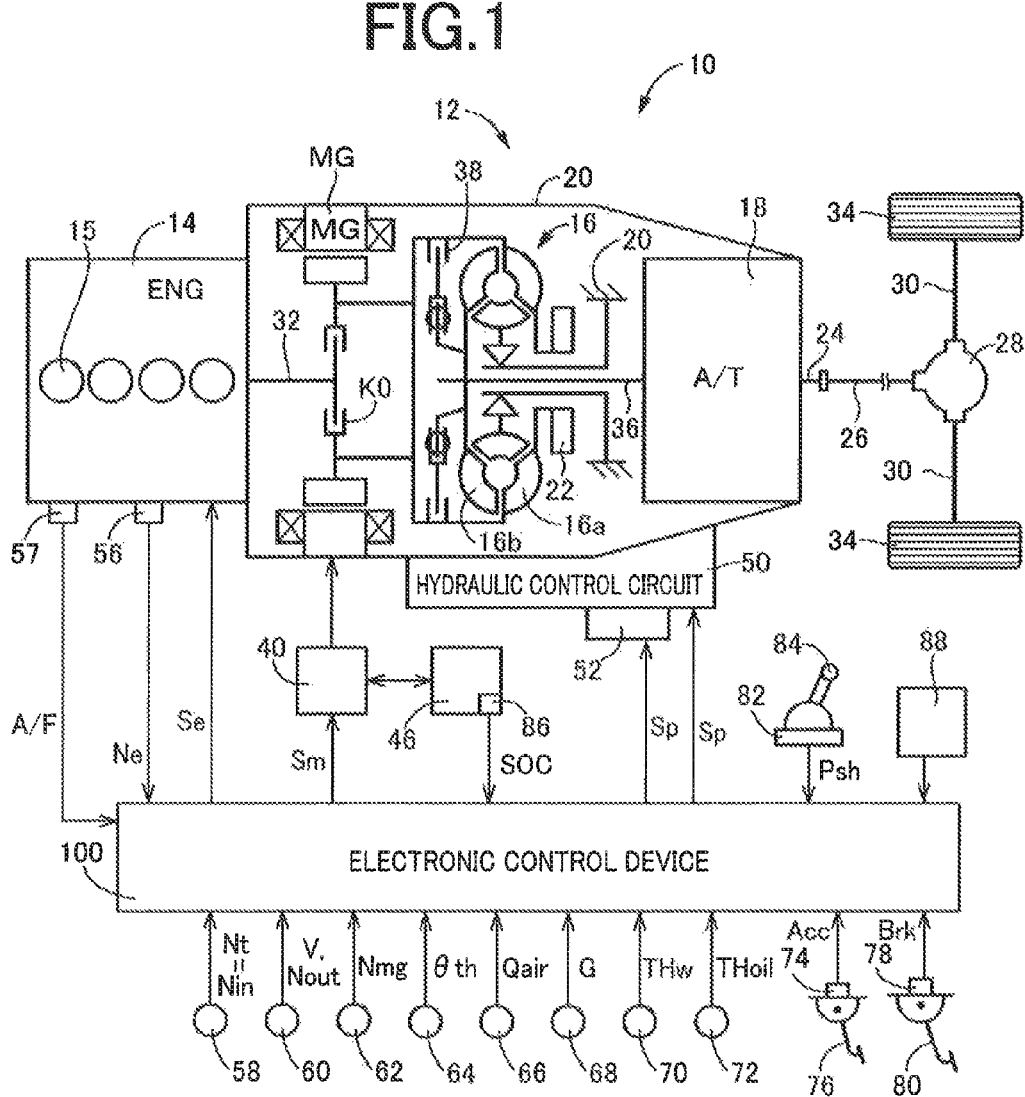

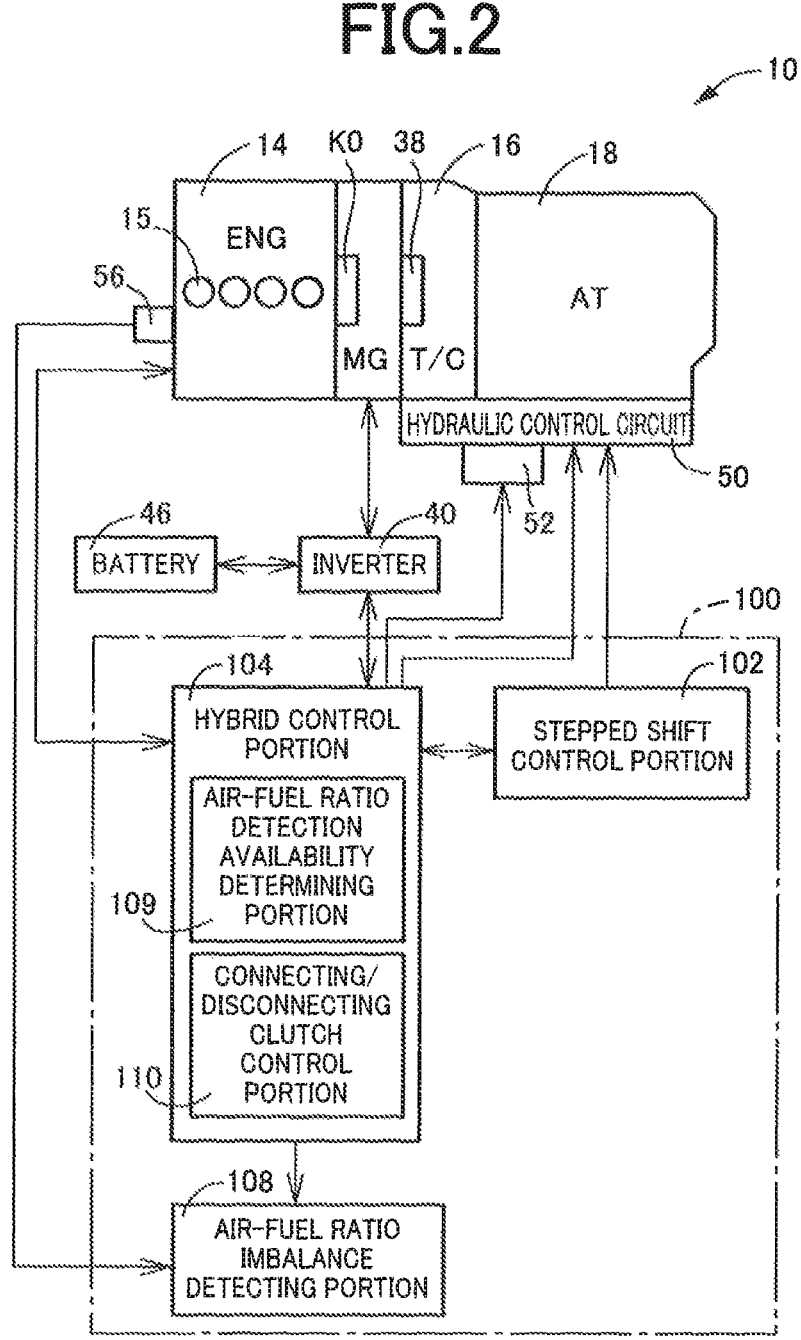

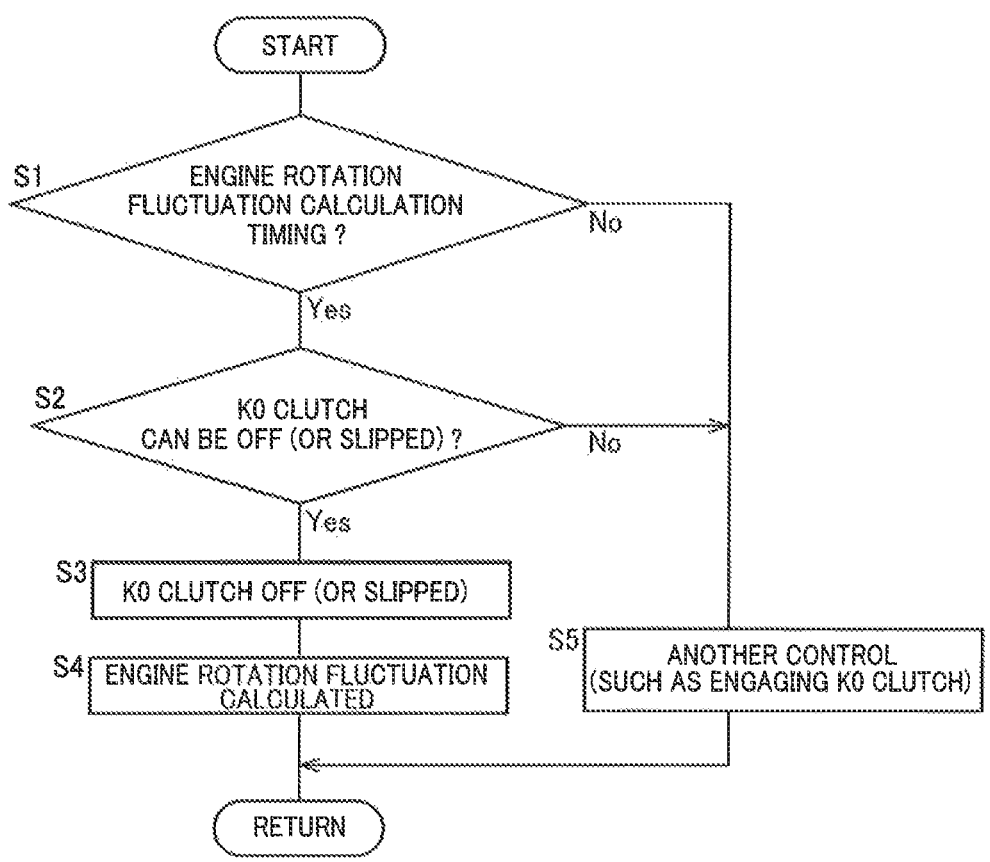

DEVICE FOR CONTROLLING HYBRID VEHICLE

TECHNICAL FIELD

The present invention relates to a control device of a hybrid vehicle and particularly relates to detection of abnormality of an engine.

BACKGROUND ART

A number of techniques have been proposed in terms of so-called onboard diagnosis (hereinafter referred to as OBD) detecting air-fuel ratio variation (air-fuel ratio imbalance) between cylinders of an engine, catalyst deterioration in an exhaust gas purifier, etc. For example, in a technique disclosed in a hybrid vehicle of Patent Document 1, when the air-fuel ratio imbalance is detected between cylinders of an engine, OBD is performed after an engine power is put into a steady state.

PRIOR ART DOCUMENT

Patent Document

Patent Document 1: Japanese Laid-Open Patent Publication No. 2012-6416

SUMMARY OF THE INVENTION

Problem to be Solved by the Invention

The hybrid vehicle of Patent Document 1 has an engine and drive wheels mechanically coupled via a plurality of gears etc. Therefore, during running, disturbance from the drive wheels and disturbance due to resonance of a drive system are transmitted to the engine. If air-fuel ratio imbalance is detected in such a state, a problem occurs since a rotation speed fluctuation of the engine is also generated by the disturbances and therefore makes it difficult to detect the air-fuel ratio imbalance detected based on the rotation speed fluctuation of the engine. In this regard, although no disturbance is input from the drive wheels during stop of a vehicle, an abnormality cannot be detected during running. Although a rotation speed can be controlled such that the resonance of the drive system is reduced so as to eliminate the influence of resonant vibration, the influence of resonant vibration cannot completely be eliminated unless the engine and the drive system are completely separated.

The present invention was conceived in view of the situations and it is therefore an object of the present invention to provide a control device of a hybrid vehicle, which is capable of detecting air-fuel ratio imbalance even during running.

Means for Solving the Problem

To achieve the object, the principle of the present invention provides a control device of a hybrid vehicle including (a) an engine, an electric motor coupled to a power transmission path between the engine and drive wheels, and a clutch connecting/disconnecting a power transmission path between the engine and both the electric motor and the drive wheels, the control device performing detection of air-fuel ratio variation between cylinders of the engine, the control device (b) changing an operation state of the clutch based on a request drive force of the vehicle when the detection of the air-fuel ratio variation is performed during running of the vehicle.

Effects of the Invention

Consequently, since the operation state of the clutch is changed based on the request drive force of the vehicle, the air-fuel ratio variation during running can be detected while the transmission of the disturbance input from the drive wheels and the disturbance due to resonant vibration of a drive system to the engine is suppressed. Since the operation state of the clutch is changed based on the request drive force, the vehicle running performance is ensured.

In a first preferred form of the invention, when the request drive force of the vehicle is larger, a slip amount of the clutch is made smaller as compared to when the request drive force is smaller. If the request drive force of the vehicle becomes larger, the engine torque of the engine and the electric motor torque of the electric motor must be used at the same time for running and, therefore, the slip amount of the clutch is made smaller, i.e., a torque capacity of the clutch is made larger. As a result, the request drive force of the vehicle can be ensured to improve the vehicle running performance. If the request drive force of the vehicle is small, the request drive force can be covered by the electric motor torque, for example, and therefore, the clutch can be released or the slip amount can be made larger to suppress the transmission of the disturbance to the engine so as to improve the accuracy of the detection of air-fuel ratio variation during running. In this way, the detection of air-fuel ratio variation can be performed while the running performance of the vehicle is ensured.

In a second preferred form of the invention, when the request drive force of the vehicle is covered even by only the electric motor, the clutch is put into an open state. As a result, since the detection of air-fuel ratio variation is performed while the transmission of the disturbance to the engine is interrupted, the accuracy of the detection of air-fuel ratio variation is improved. Since the request drive force of the vehicle is output from the electric motor, the vehicle running performance is ensured.

In a third preferred form of the invention, when the request drive force of the vehicle is output by using the engine and the electric motor at the same time, the clutch is put into an engaged state or a slip state. In this way, the operation state of the clutch can be controlled based on the request drive force so as to ensure the request drive force and improve the vehicle running performance.

BRIEF DESCRIPTION OF THE DRAWINGS

FIG. 1 is a diagram for explaining a general configuration of a power transmission path from an engine and an electric motor to drive wheels making up a hybrid vehicle to which the present invention is preferably applied.

FIG. 2 is a functional block diagram for explaining a main portion of the control function of an electronic control device in FIG. 1.

FIG. 3 is a flowchart for explaining a main portion of the control operation of the electronic control device in FIG. 1, i.e., the control operation in which the detection of air-fuel ratio imbalance can accurately be performed during running.

MODE FOR CARRYING OUT THE INVENTION

An example of the present invention will now be described in detail with reference to the drawings. In the following example, the figures are simplified or deformed as needed and portions are not necessarily precisely depicted in terms of dimension ratio, shape, etc.

Example

FIG. 1 is a diagram for explaining a general configuration of a power transmission path from an engine 14 and an electric motor MG to drive wheels 34 making up a hybrid vehicle 10 (hereinafter referred to as the vehicle 10) to which the present invention is preferably applied, and is a diagram for explaining a main portion of a control system disposed in the vehicle 10 for output control of the engine 14 acting as a running drive force source, shift control of an automatic transmission 18, drive control of the electric motor MG, etc.

In FIG. 1, a vehicle power transmission device 12 (hereinafter referred to as the power transmission device 12) includes an engine connecting/disconnecting clutch K0, the electric motor MG, a torque converter 16, an oil pump 22, the automatic transmission 18, etc., in order from the engine 14 side in a transmission case 20 (hereinafter referred to as the case 20) acting as a non-rotating member attached to a vehicle body by a bolt etc. The power transmission device 12 also includes a propeller shaft 26 coupled to an output shaft 24 that is an output rotating member of the automatic transmission 18, a differential gear device (differential gear) 28 coupled to the propeller shaft 26, a pair of axles 30 coupled to the differential gear device 28, etc. The power transmission device 12 configured as described above is preferably used in the vehicle 10 of the FR (front-engine rear-drive) type, for example. In the power transmission device 12, if the engine connecting/disconnecting clutch K0 is engaged, the power of the engine 14 is transmitted from an engine coupling shaft 32 coupling the engine 14 and the engine connecting/disconnecting clutch K0, sequentially through the engine connecting/disconnecting clutch K0, the torque converter 16, the automatic transmission 18, the propeller shaft 26, the differential gear device 28, a pair of the axles 30, etc., to a pair of the drive wheels 34.

The torque converter 16 is a fluid power transmission device transmitting a drive force input to a pump impeller 16a via fluid toward the automatic transmission 18. The pump impeller 16a is coupled sequentially through the engine connecting/disconnecting clutch K0 and the engine coupling shaft 32 to the engine 14 and is an input-side rotating element receiving input of the drive force from the engine 14 and rotatable around an axial center. A turbine impeller 16b of the torque converter 16 is an output-side rotating element of the torque converter 16 and is relatively non-rotatably coupled by spline fitting, etc. to a transmission input shaft 36 that is an input rotating member of the automatic transmission 18. The torque converter 16 includes a lockup clutch 38. The lockup clutch 38 is a direct clutch disposed between the pump impeller 16a and the turbine impeller 16b and is put into an engaged state, a slip state, or an open state by hydraulic control etc.

The electric motor MG is coupled to a power transmission path between the engine 14 and the drive wheels 34 and is a so-called motor generator having a function of a motor generating a mechanical drive force from electric energy and a function of an electric generator generating electric energy from mechanical energy. In other words, the electric motor MG may act as a running drive force source generating a running drive force, instead of the engine 14 that is a power source or along with the engine 14. The electric motor MG also performs operations such as generating electric energy through regeneration from a drive force generated by the engine 14 or a driven force (mechanical energy) input from the drive wheels 34 to accumulate the electric energy via an inverter 40, a boost converter (not depicted), etc. into a battery 46 that is an electric storage device. The electric motor MG is operatively coupled to the pump impeller 16a, and power is mutually transmitted between the electric motor MG and the pump impeller 16a. Therefore, the electric motor MG is coupled to the transmission input shaft 36 in a power transmittable manner as is the case with the engine 14. The electric motor MG is connected to give/receive electric power via the inverter 40, the boost converter (not depicted), etc. to/from the battery 46. In the case of running by using the electric motor MG as the running drive force source, the engine connecting/disconnecting clutch K0 is opened and the power of the electric motor MG is transmitted sequentially through the torque converter 16, the automatic transmission 18, the propeller shaft 26, the differential gear device 28, a pair of the axles 30, etc., to a pair of the drive wheels 34.

The oil pump 22 is a mechanical oil pump coupled to the pump impeller 16a and rotationally driven by the engine 14 (or the electric motor MG) to generate a hydraulic oil pressure for providing the shift control of the automatic transmission 18, controlling a torque capacity of the lockup clutch 38, controlling engagement/open of the engine connecting/disconnecting clutch K0, and supplying lubricant oil to the portions of the power transmission path of the vehicle 10. The power transmission device 12 includes an electric oil pump 52 driven by an electric motor (not depicted) and supplementarily actuates the electric oil pump 52 to generate oil pressure when the oil pump 22 is not driven, for example, during stop of the vehicle.

The engine connecting/disconnecting clutch K0 is a wet multi-plate type hydraulic friction engagement device in which a plurality of friction plates overlapped with each other is pressed by a hydraulic actuator, for example, and is subjected to engagement/open control by a hydraulic control circuit 50 disposed in the power transmission device 12 by using, as an original pressure, an oil pressure generated by the oil pump 22 and the electric oil pump 52. In the engagement/open control, a power-transmittable torque capacity of the engine connecting/disconnecting clutch K0, i.e., an engagement force of the engine connecting/disconnecting clutch K0 is varied, for example, continuously, through pressure adjustment of a linear solenoid valve etc., in the hydraulic control circuit 50. The engine connecting/disconnecting clutch K0 includes a pair of clutch rotating members (a clutch hub and a clutch drum) that are rotatable relative to each other in the open state thereof, and one of the clutch rotating members (the clutch hub) is relatively non-rotatably coupled to the engine coupling shaft 32 while the other clutch rotating member (the clutch drum) is relatively non-rotatably coupled to the pump impeller 16a of the torque converter 16. Because of such a configuration, the engine connecting/disconnecting clutch K0 rotates the pump impeller 16a integrally with the engine 14 via the engine coupling shaft 32 in the engaged state. Therefore, in the engaged state of the engine connecting/disconnecting clutch K0, the drive force from the engine 14 is input to the pump impeller 16a. On the other hand, in the open state of the engine connecting/disconnecting clutch K0, the power transmission between the pump impeller 16a and the engine 14 is interrupted. As described above, since the electric motor MG is operatively coupled to the pump impeller 16a, the engine connecting/disconnecting clutch K0 acts as a clutch connecting/disconnecting the power transmission path between the engine 14 and the electric motor MG. For the engine connecting/disconnecting clutch K0 of this example, a so-called normally open type clutch is used that has a torque capacity (engagement force) increased in proportional to an oil pressure and that is put into an open state while no oil pressure is supplied.

The automatic transmission 18 is coupled to the electric motor MG without via the engine connecting/disconnecting clutch K0 in a power transmittable manner in which the power is transmittable from the motor MG to the transmission 18 without via the clutch K0. The automatic transmission 18 makes up a portion of the power transmission path from the engine 14 and the electric motor MG to the drive wheels 34 to transmit the power from the running drive force source (the engine 14 and the electric motor MG) toward the drive wheels 34. For example, the automatic transmission 18 is a planetary-gear type multistage transmission acting as a stepped automatic transmission in which a shift is made to selectively establish a plurality of shift stages (gear stages) by switching any of a plurality of engagement devices to be gripped, for example, hydraulic friction engagement devices such as a clutch C and a brake B (i.e., by engagement and open of the hydraulic friction engagement devices). Therefore, the automatic transmission 18 is a stepped transmission performing a so-called clutch-to-clutch shift frequently used in known vehicles and changes the speed of the rotation input to the transmission input shaft 36 to output the rotation from the output shaft 24. The transmission input shaft 36 is also a turbine shaft rotationally driven by the turbine impeller 16b of the torque converter 16. The automatic transmission 18 has a predetermined gear stage (shift stage) established depending on an accelerator operation of a driver, a vehicle speed V etc., through the engagement/open control of each of the clutch C and the brake B. When both the clutch C and the brake B are opened in the automatic transmission 18, a neutral state is achieved and the power transmission path between the drive wheels 34 and both the engine 14 and the electric motor MG is interrupted.

Returning to FIG. 1, the vehicle 10 includes an electronic control device 100 including a control device related to hybrid drive control, for example. The electronic control device 100 includes a so-called microcomputer including a CPU, a RAM, a ROM, and an I/O interface, for example, and the CPU executes signal processes in accordance with a program stored in advance in the ROM, while utilizing a temporary storage function of the RAM, to provide various controls of the vehicle 10. For example, the electronic control device 100 provides the output control of the engine 14, the drive control of the electric motor MG including regenerative control of the electric motor MG, the shift control of the automatic transmission 18, the torque capacity control of the lockup clutch 38, the torque capacity control of the engine connecting/disconnecting clutch K0, etc., and is configured separately for the engine control, the electric motor control, the hydraulic control (shift control), etc., as needed.

The electronic control device 100 is supplied with, for example, a signal indicative of an engine rotation speed Ne that is the rotation speed of the engine 14 detected by an engine rotation speed sensor 56; a signal indicative of an air-fuel ratio A/F of the engine 14 detected by an air-fuel ratio sensor 57; a signal indicative of a turbine rotation speed Nt of the torque converter 16 as an input rotation speed of the automatic transmission 18 detected by a turbine rotation speed sensor 58, i.e., a transmission input rotation speed Nin that is the rotation speed of the transmission input shaft 36; a signal indicative of a transmission output rotation speed Nout that is the rotation speed of the output shaft 24 corresponding to the vehicle speed V or a rotation speed of the propeller shaft 26 as a vehicle speed related value detected by an output shaft rotation speed sensor 60; a signal indicative of an electric motor rotation speed Nmg that is the rotation speed of the electric motor MG detected by an electric motor rotation speed sensor 62; a signal indicative of a throttle valve opening degree θth that is an opening degree of an electronic throttle valve (not depicted) detected by a throttle sensor 64; a signal indicative of an intake air amount Qair of the engine 14 detected by an intake air amount sensor 66; a signal indicative of longitudinal acceleration G (or longitudinal deceleration G) of the vehicle 10 detected by an acceleration sensor 68; a signal indicative of a cooling water temperature THw of the engine 14 detected by a cooling water temperature sensor 70; a signal indicative of a hydraulic oil temperature THoil of the hydraulic oil in the hydraulic control circuit 50 detected by an oil temperature sensor 72; a signal indicative of an accelerator opening degree Acc which is an operation amount of an accelerator pedal 76 as a drive force request amount (driver request output) for the vehicle 10 from as driver, and which is detected by an accelerator opening degree sensor 74; a signal indicative of a brake operation amount Brk which is an operation amount of a brake pedal 80 as a braking power request amount (driver request deceleration) for the vehicle 10 from a driver, and which is detected by a foot brake sensor 78; a signal indicative of a lever position (a shift operation position, a shift position, an operation position) Psh of a shift lever 84, such as known "P", "N", "D", "R", and "S" positions, detected by a shift position sensor 82; and a charge amount (charge capacity, charge remaining amount) SOC of the battery portion 46 detected by a battery sensor 86. The electronic control device 100 is supplied with electric power from an accessory battery 88 charged with electric power stepped down by a DC-DC converter (not depicted).

The electronic control device 100 outputs, for example, an engine output control command signal Se for the output control of the engine 14; an electric motor control command signal Sm for controlling the operation of the electric motor MG; and an oil pressure command signal Sp for actuating electromagnetic valves (solenoid valves) included in the hydraulic control circuit 50, the electric oil pump 52, etc. for controlling hydraulic actuators of the engine connecting/disconnecting clutch K0 and the clutch C and the brake B of the automatic transmission 18.

FIG. 2 is a functional block diagram for explaining a main portion of the control function of the electronic control device 100. In FIG. 2, a stepped shift control portion 102 (a stepped shift control means) acts as a shift control portion making a shift of the automatic transmission 18. The stepped shift control portion 102 determines whether a shift of the automatic transmission 18 should be made, for example, based on a vehicle running state indicated by the actual vehicle speed V and accelerator opening degree Acc from a known relationship (shift diagram, shift map) having an upshift line and a downshift line stored in advance by using the vehicle speed V and the accelerator opening degree Acc (or the transmission output torque Tout etc.) as variables, i.e., determines a gear stage to be achieved by the automatic transmission 18 based on the vehicle running state, and provides the automatic shift control of the automatic transmission 18 such that the determined gear stage is acquired. For example, if the accelerator opening degree Acc (vehicle request torque) exceeds the downshift line to be a higher accelerator opening degree (higher vehicle request torque) in association with an increase in the accelerator opening degree Acc due to an additional depression operation of the accelerator pedal 76, the stepped shift control means 102 determines that a downshift request for the automatic transmission 18 is made, and provides the downshift control of the automatic transmission 18 corresponding to the downshift line. In this case, the stepped shift control means 102 outputs to the hydraulic control circuit 50 a command (shift output command, oil pressure command) Sp engaging and/ or opening the engagement devices involved with the shift of the automatic transmission 18 such that the gear stage is achieved in accordance with a predetermined engagement operation table stored in advance, for example. The hydraulic control circuit 50 actuates the linear solenoid valves in the hydraulic control circuit 50 to actuate the hydraulic actuators of the engagement devices involved with the shift such that the shift of the automatic transmission 18 is made by, for example, opening an open-side clutch and engaging an engagement-side clutch in accordance with the command Sp.

A hybrid control portion 104 (a hybrid control means) has a function as an engine drive control portion controlling the drive of the engine 14 and a function as an electric motor actuation control portion controlling the actuation of the electric motor MG as a drive force source or an electric generator through the inverter 40, and provides control of the hybrid drive by the engine 14 and the electric motor MG etc. through these control functions. For example, the hybrid control means 104 calculates a request drive torque Tr of the vehicle from the accelerator opening degree Acc and the vehicle speed V and controls the running drive force source (the engine 14 and the electric motor MG) such that the request drive torque Tr is acquired in consideration of a transmission loss, an accessory load, a gear stage of the automatic transmission 18, the charge amount SOC of the battery 46, etc.

More specifically, for example, if the vehicle request torque Tr is within a range that can be covered solely by the output torque (electric motor torque) Tmg of the electric motor MG, the hybrid control means 104 sets a running mode to a motor running mode (hereinafter, EV running mode) and performs the motor running (EV running) using only the electric motor MG as the running drive force source. On the other hand, for example, if the vehicle request torque Tr is within a range that cannot be covered unless at least the output torque (engine torque) Te of the engine 14 is used, the hybrid control means 104 sets the running mode to an engine running mode (hybrid running mode), and performs the engine running using at least the engine 14 as the running drive force source.

If the EV running is performed, the hybrid control portion 104 opens the engine connecting/disconnecting clutch K0 to interrupt the power transmission path between the engine 14 and the torque converter 16 and causes the electric motor MG to output the electric motor torque Tmg required for the motor running. On the other hand, if the engine running (hybrid running) is performed, the hybrid control means 104 engages the engine connecting/disconnecting clutch K0 to transmit the drive force from the engine 14 to the pump impeller 16a and causes the electric motor MG to output an assist torque as needed. When the oil pump 22 is not driven, for example, during stop of the vehicle, the hybrid control means 104 supplementarily actuates the electric oil pump 52 to prevent a shortage of the hydraulic oil.

If the vehicle request torque Tr (request drive torque) is increased due to, for example, the additional depression operation of the accelerator pedal 76 during the EV running and the electric motor torque Tmg required for the EV running corresponding to the vehicle request drive force Tr exceeds a predetermined EV running torque range in which the EV running can be performed, the hybrid control means 104 switches the running mode from the EV running mode to the engine running mode and starts the engine 14 to perform the engine running. At this start of the engine 14, while engaging the engine connecting/disconnecting clutch K0 toward the complete engagement, the hybrid control means 104 increases the rotation of the engine 14 by transmitting an engine start torque Tmgs for engine start from the electric motor MG via the engine connecting/ disconnecting clutch K0 and starts the engine 14 by raising the engine rotation speed Ne to a rotation speed enabling self-sustaining operation and by controlling engine ignition, fuel supply, etc. After the engine 14 is started, the hybrid control means 104 promptly achieves the complete engagement of the engine connecting/disconnecting clutch K0.

The hybrid control means 104 has a function as a regenerative control means that allows the electric motor MG to be rotationally driven by kinetic energy of the vehicle 10, i.e., a reverse drive force transmitted from the drive wheels 34 toward the engine 14 and that charges the battery 46 through the inverter 40 with the electric energy so as to improve the fuel consumption during coasting (during inertia running) with acceleration turned off, during braking by depression of the brake pedal 80, etc. This regenerative control is controlled to achieve a regenerative amount determined based on the charge amount SOC of the battery 46, the braking force distribution of a braking force from a hydraulic brake for acquiring a braking force corresponding to a brake pedal operation amount, etc. The hybrid control means 104 engages the lockup clutch 38 during the regenerative control.

To detect an abnormality of the engine 14, so-called onboard diagnosis (hereinafter, OBD) is performed to detect (diagnose) a plurality of abnormalities related to the engine 14. For example, an example of OBD is detection of air-fuel ratio variation (hereinafter, detection of air-fuel ratio imbalance) between cylinders 15 of the engine 14 and detection of misfire of the engine 14. This air-fuel ratio imbalance is detected based on engine rotation fluctuation, for example, and it is determined that an abnormality occurs when the engine rotation fluctuation exceeds a predetermined value.

When performing the detection of air-fuel ratio imbalance, it is desirable that the operation state of the engine 14 is stable. However, when the engine connecting/disconnecting clutch K0 is connected during the detection of air-fuel ratio imbalance, the power transmission path is connected between the engine 14 and the drive wheels 34 and, therefore, if disturbance is input from the drive wheels 34, the influence thereof is transmitted to the engine 14. For example, when the vehicle is running on a wavelike road and a low friction road, the drive wheels 34 repeat a slip and a grip, causing rotational fluctuation of the drive wheels 34. This rotational fluctuation of the drive wheels 34 is transmitted via the engine connecting/disconnecting clutch K0 to the engine 14. Also, if resonant vibration occurs in the power transmission device 12 (drive system), the resonant vibration is transmitted via the engine connecting/disconnecting clutch K0 to the engine 14. If the detection of air-fuel ratio imbalance is performed in such a case, the detection accuracy of the detection of air-fuel ratio imbalance is reduced and, therefore, it becomes difficult to perform the detection of air-fuel ratio imbalance. Thus, when performing the detection of air-fuel ratio imbalance, the electronic control device 100 changes an operation state of the engine connecting/disconnecting clutch K0 based on the request drive force Tr of the vehicle. The operation and effect according to the present invention will hereinafter be described.

Returning to FIG. 2, an air-fuel ratio imbalance detecting portion 108 (an air-fuel ratio imbalance detecting means) sequentially calculates as a parameter of engine rotation fluctuation, for example, a change amount ΔNe of the engine rotation speed Ne in every 180-degree rotation of the crank angle of the engine 14 or a change ΔT of an elapse time T in every 30-degree rotation of the crank angle and determines that the air-fuel ratio imbalance has occurred if the calculated change amount ΔNe or change ΔT of the elapse time T exceeds a preset threshold value α. The threshold value α is obtained in advance based on an experiment etc., and is set to a value detected when the air-fuel ratio imbalance has occurred.

Whether the air-fuel ratio imbalance detecting portion 108 is implemented is determined based on an air-fuel ratio detection availability determining portion 109 (an air-fuel ratio detection availability means). The air-fuel ratio detection availability determining portion 109 determines whether the engine 14 is in an operation state suitable for the detection of air-fuel ratio imbalance. The air-fuel ratio detection availability determining portion 109 determines, for example, whether the engine 14 is in a warmed-up state based on an engine water temperature etc., whether the engine rotation speed Ne is within a preset range suitable for the detection of the air-fuel ratio imbalance, etc., and determines that the air-fuel ratio imbalance can be detected if the engine 14 is in a preset operation region suitable for the detection of the air-fuel ratio imbalance.

The air-fuel ratio detection availability determining portion 109 also determines whether the request drive force Tr is less than a preset predetermined value Ta. This predetermined value Ta is obtained from a sum (=Tmg+T) of the electric motor torque Tmg, which can be output by the electric motor MG and which is determined from the charge capacity SOC of the battery 46 etc., and a transmission torque T transmitted from the engine 14 toward the drive wheels 34 when a slip amount S of the engine connecting/disconnecting clutch K0 reaches a preset value Slim.

If the electric motor torque Tmg set based on the charge capacity SOC of the battery 46 is smaller than the request drive force Tr, the electric motor torque Tmg of the electric motor MG and the engine torque Te of the engine 14 must be used at the same time. In such a case, the engine connecting/disconnecting clutch K0 is engaged or slipped to transmit the engine torque Te to the drive wheels 34 and, if the engine connecting/disconnecting clutch K0 is completely engaged or slipped, the power transmission path between the engine 14 and the drive wheels 34 is connected and, therefore, the disturbance input from the drive wheels 34 and the disturbance due to resonant vibration are transmitted to the engine 14. When the request drive force Tr is larger, the transmission torque T to be transmitted from the engine 14 to the drive wheels 34 becomes larger as compared to when the request drive force Tr is smaller and, therefore, the slip amount S of the engine connecting/disconnecting clutch K0 becomes smaller, facilitating the transmission of the disturbance to the engine 14. Thus, the slip amount Slim not allowing the disturbance to affect the detection accuracy of the air-fuel ratio imbalance is obtained in advance from an experiment etc., so as to set the predetermined value Ta to the sum (=Tmg+T) of the transmission torque T, which is transmitted from the engine 14 toward the drive wheels 34 and which is calculated based on the slip amount Slim, and the electric motor torque Tmg that can be output. The slip amount Slim may be changed depending the engine torque Te, for example.

As a result, if the request drive force Tr is equal to or greater than the predetermined value Ta, the engine connecting/disconnecting clutch K0 is equal to or less than the slip amount Slim and, therefore, the influences of the disturbance input from the drive wheels 34 and the disturbance due to resonant vibration are made larger. Particularly, when the engine connecting/disconnecting clutch K0 is completely engaged, the disturbance input from the drive wheels 34 and the disturbance due to resonant vibration are transmitted to the engine 14 without the disturbances being reduced by the engine connecting/disconnecting clutch K0 and, therefore, it becomes difficult to perform the detection of air-fuel ratio imbalance. In such a case, the air-fuel ratio detection availability determining portion 109 inhibits the detection of air-fuel ratio imbalance. For example, even when the vehicle is running with the engine connecting/disconnecting clutch K0 opened, the request drive force Tr is increased if the accelerator pedal is deeply depressed. In such case, the engine connecting/disconnecting clutch K0 is to be engaged and, therefore, the air-fuel ratio detection availability determining portion 109 inhibits the detection of air-fuel ratio imbalance.

On the other hand, if the request drive force Tr is less than the predetermined value Ta, the engine connecting/disconnecting clutch K0 exceeds the slip amount Slim and, therefore, the influences of the disturbance input from the drive wheels 34 and the disturbance due to resonant vibration are made smaller. In such a case, the air-fuel ratio detection availability determining portion 109 permits the execution of the detection of air-fuel ratio imbalance. Particularly, when the request drive force Tr can be output solely by the electric motor torque Tmg, the engine connecting/disconnecting clutch K0 is put into the open state to enable the EV running by the electric motor MG. Since neither the disturbance input from the drive wheels 34 nor the disturbance due to resonant vibration is transmitted to the engine 14, such a case is optimal for the detection of air-fuel ratio imbalance.

If the operation state of the engine 14 is suitable for the detection of air-fuel ratio imbalance and the request drive force Tr is smaller than the predetermined value Ta, the air-fuel ratio detection availability determining portion 109 determines that the air-fuel ratio imbalance detecting portion 108 can be implemented.

If it is determined that the detection of air-fuel ratio imbalance can be performed based on the air-fuel ratio detection availability determining portion 109, a connecting/disconnecting clutch control portion 110 is implemented before the detection of air-fuel ratio imbalance. The connecting/disconnecting clutch control portion 110 changes the operation state of the engine connecting/disconnecting clutch K0 based on the request drive force Tr. Specifically, when the request drive force Tr is larger, the connecting/disconnecting clutch control portion 110 makes the slip amount S of the engine connecting/disconnecting clutch K0 smaller as compared to when the request drive force Tr is smaller. If the detection of air-fuel ratio imbalance is performed, it is desirable to make the slip amount S of the engine connecting/disconnecting clutch K0 larger so as to reduce the influences of the disturbance input from the drive wheels 34 and the disturbance due to resonant vibration. However, as the request drive force Tr becomes larger, the slip amount S must be made smaller to ensure running performance, i.e., to increase the torque transmitted from the engine 14 to the drive wheels 34. Therefore, to suppress the influences of the disturbance and the resonant vibration, the connecting/disconnecting clutch control portion 110 provides control such that the slip amount S becomes at least larger than the slip amount Slim within a range in which the request drive force Tr is ensured. As a result, when the request drive force Tr is larger, the slip amount S of the engine connecting/disconnecting clutch K0 becomes smaller as compared to when the request drive force Tr is smaller.

Particularly, when the request drive force Tr can be output solely by the electric motor torque Tmg of the electric motor MG, the engine torque Te is not required. In such a case, since the engine connecting/disconnecting clutch K0 does not have to be engaged, the connecting/disconnecting clutch control portion 110 puts the engine connecting/disconnecting clutch K0 into the open state. Therefore, the disturbance input from the drive wheels 34 and the disturbance due to resonant vibration are not transmitted to the engine 14 and the detection of air-fuel ratio imbalance can accurately be performed. While the air-fuel ratio imbalance is detected, the EV running is performed by the electric motor MG and, therefore, the running performance is ensured.

FIG. 3 is a flowchart for explaining a main portion of the control operation of the electronic control device 100, i.e., the control operation in which the detection of air-fuel ratio imbalance can accurately be performed during running. This flowchart is repeatedly executed with an extremely short cycle time, for example, on the order of few msec to a few tens of msec.

At step S1 (hereinafter, step will be omitted) corresponding to the air-fuel ratio detection availability determining portion 109, it is determined whether the engine 14 is in an operation state suitable for the detection of air-fuel ratio imbalance. If S1 is negative, it is determined that the detection of air-fuel ratio imbalance cannot be performed and another control other than the air-fuel ratio imbalance is provided at S5. If S1 is affirmative, at S2 corresponding to the air-fuel ratio detection availability determining portion 109, it is determined whether the engine connecting/disconnecting clutch K0 can be opened or slipped. Specifically, it is determined whether the detection of air-fuel ratio imbalance can be performed, based on whether the request drive force Tr is less than the preset predetermined value Ta. If S2 is negative, it is determined that the detection of air-fuel ratio imbalance cannot be performed because of an increased influence of the disturbance, and another control (e.g., engagement of the engine connecting/disconnecting clutch K0) is provided at S5. If S2 is affirmative, the engine connecting/disconnecting clutch K0 is controlled between open and slip based on the request drive force Tr at S3 corresponding to the connecting/disconnecting clutch control portion 110. Subsequently, at S4 corresponding to the air-fuel ratio imbalance detecting portion 108, the engine rotation fluctuation is calculated and the air-fuel ratio imbalance is detected based on the value thereof.

As described above, according to this example, since the operation state of the engine connecting/disconnecting clutch K0 is changed based on the request drive force Tr of the vehicle, the air-fuel ratio imbalance during running can be detected while the transmission of the disturbance input from the drive wheels 34 and the disturbance due to resonant vibration to the engine 14 is suppressed. Since the operation state of the engine connecting/disconnecting clutch K0 is changed based on the request drive force Tr, the vehicle running performance is ensured.

According to this example, when the request drive force Tr of the vehicle is larger, the slip amount S of the engine connecting/disconnecting clutch K0 is made smaller as compared to when the request drive force Tr is smaller. If the request drive force Tr of the vehicle becomes larger, the engine torque Te of the engine 14 and the electric motor torque Tmg of the electric motor MG must be used at the same time for running and, therefore, the slip amount S of the engine connecting/disconnecting clutch K0 is made smaller, i.e., the torque capacity of the engine connecting/disconnecting clutch K0 is made larger. As a result, the request drive force Tr of the vehicle can be ensured to improve the vehicle running performance. If the request drive force Tr of the vehicle is small, the request drive force Tr can be covered by the electric motor torque Tmg, for example, and therefore, the engine connecting/disconnecting clutch K0 can be released or the slip amount S can be made larger to suppress the transmission of the disturbance to the engine 14 so as to improve the accuracy of the detection of air-fuel ratio imbalance during running. In this way, the detection of air-fuel ratio imbalance can be performed even during running while the running performance of the vehicle is ensured.

According to this example, if the request drive force Tr of the vehicle is outputtable even by only the electric motor MG, the engine connecting/disconnecting clutch K0 is put into the open state. As a result, since the detection of air-fuel ratio imbalance is performed while the transmission of the disturbance to the engine 14 is interrupted, the accuracy of the detection of air-fuel ratio imbalance is improved. Since the request drive force Tr of the vehicle is output from the electric motor MG, the vehicle running performance is ensured.

According to this example, if the request drive force Tr of the vehicle is output by using the engine 14 and the electric motor MG at the same time, the engine connecting/disconnecting clutch K0 is put into an engaged state or a slip state. In this way, the operation state of the engine connecting/disconnecting clutch K0 can be controlled based on the request drive force Tr so as to ensure the request drive force Tr and improve the vehicle running performance.

Although the example of the present invention has been described in detail with reference to the drawings, the present invention is applied in other forms.

Although the engine connecting/disconnecting clutch K0 is opened or slipped when the detection of air-fuel ratio imbalance is performed in the example, the detection of air-fuel ratio imbalance may be performed only when the engine connecting/disconnecting clutch K0 is opened. Therefore, if the engine connecting/disconnecting clutch K0 is slipped, the detection of air-fuel ratio imbalance is always inhibited. When the engine connecting/disconnecting clutch K0 is slipped, the influence of the disturbance is more or less transmitted to the engine 14 and, therefore, this influence can completely be excluded to perform the detection of air-fuel ratio imbalance.

Although the vehicle power transmission device 12 of the example has the torque converter 16 and the automatic transmission 18 disposed between the electric motor MG and the drive wheels 34, these are not necessarily required. Although the automatic transmission 18 is a planetary-gear type multistage transmission in which a shift is made by switching any of hydraulic friction engagement devices to be gripped, this is an example and a transmission of another form such as a belt type continuously variable transmission may be disposed.

The above description is merely an embodiment and the present invention may be implemented in variously modified and improved forms based on the knowledge of those skilled in the art.

NOMENCLATURE OF ELEMENTS

10: hybrid vehicle
14: engine
15: cylinders
100: electronic control device (control device)
MG: electric motor
K0: engine connecting/disconnecting clutch (clutch)

The invention claimed is:

1. A control device of a hybrid vehicle including an engine, an electric motor disposed on a first power transmission path between the engine and drive wheels, and a clutch connecting/disconnecting a second power transmission path between the engine and the electric motor, the second power transmission path being part of the first power transmission path, the control device performing detection of air-fuel ratio variation between cylinders of the engine, the control device changing an operation state of the clutch based on a request drive force of the vehicle, the control device performing the detection of air-fuel ratio variation when the clutch is in an open state or a slip amount of the clutch is equal to or larger than a preset value during running of the vehicle, and the preset value being a value not allowing a disturbance input from the drive wheels and a disturbance due to resonant vibration of a drive system to affect a detection accuracy of the detection of air-fuel ratio variation.

2. The control device of claim 1, wherein when the request drive force of the vehicle is larger, the slip amount of the clutch is made smaller as compared to when the request drive force is smaller.

3. The control device of claim 1, wherein when the request drive force of the vehicle is covered even by only the electric motor, the clutch is put into the open state.

4. The control device of claim 1, wherein when the request drive force of the vehicle is output by using the engine and the electric motor at the same time, the clutch is put into an engaged state or a slip state.

* * * * *